United States Patent [19]
Krivec

[11] 3,804,230
[45] Apr. 16, 1974

[54] CONVEYOR TRANSFER STATION
[75] Inventor: Bert Krivec, Waukesha, Wis.
[73] Assignee: Rexnord Inc., Milwaukee, Wis.
[22] Filed: Feb. 8, 1973
[21] Appl. No.: 330,522

[52] U.S. Cl............................ 198/127 R, 193/35 MD
[51] Int. Cl............................................... B65g 13/02
[58] Field of Search................ 198/127; 193/35 MD

[56] References Cited
UNITED STATES PATENTS
3,552,541  1/1971  Riggs.............................. 198/127 R Primary Examiner—Richard E. Aegerter
Attorney, Agent, or Firm—Sughrue, Rothwell, Mion, Zinn and Macpeak

[57] ABSTRACT

A conveyor transfer station permitting selective transfer of articles being carried on one or more incoming conveyors on to a selected one of a plurality of outgoing conveyors. The transfer station comprises a plurality of roller assemblies, each of which in turn comprise a hollow cylindrical roller having a plurality of spaced apertures in the surface thereof, a plurality of stub rollers mounted in the hollow roller such that their axes of rotation are not parallel to the axes of rotation of the hollow roller and a portion of their surfaces protrude through corresponding apertures in the hollow roller, and means for rotating the hollow roller and the stub rollers independently.

14 Claims, 15 Drawing Figures

PATENTED APR 16 1974 3,804,230

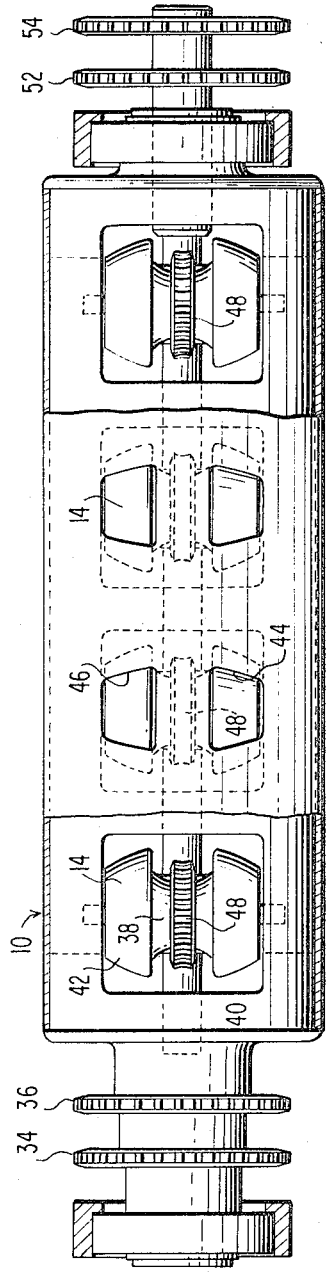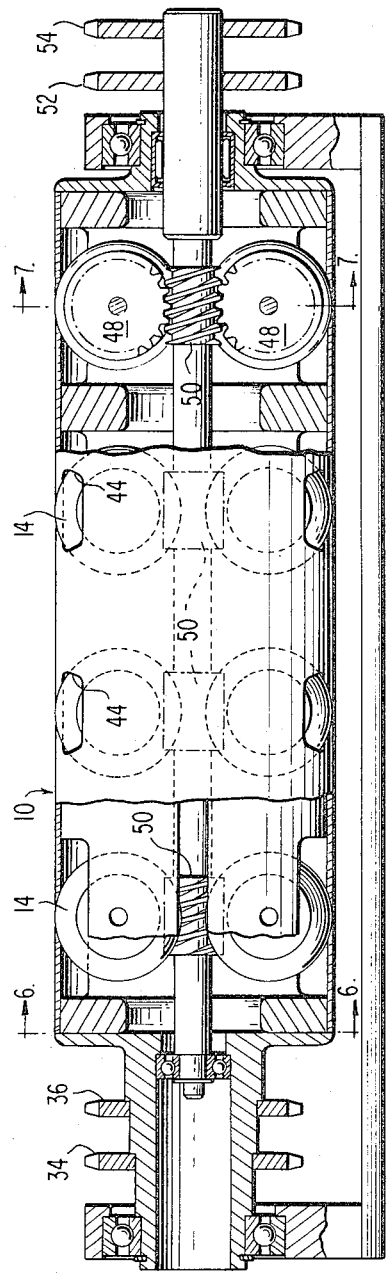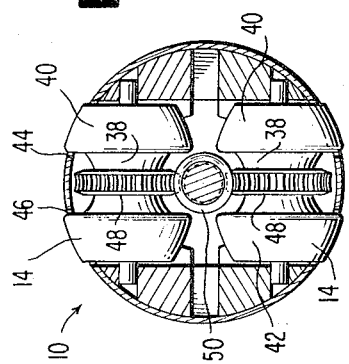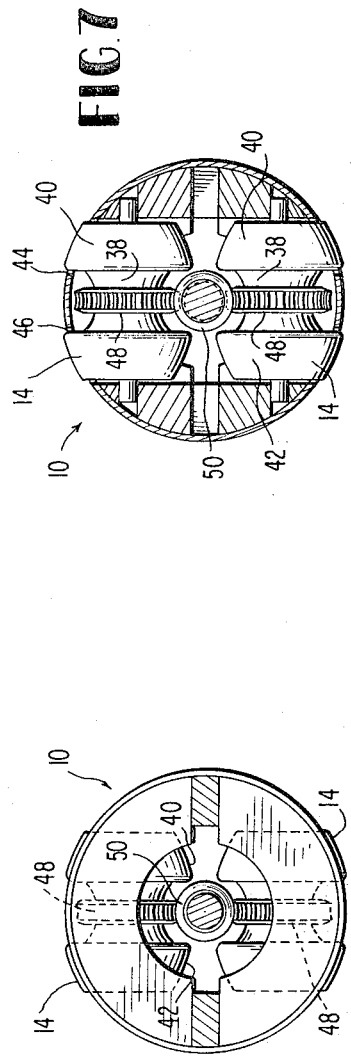

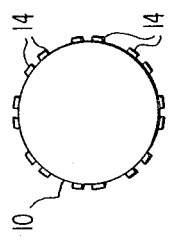
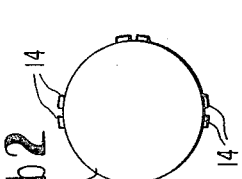
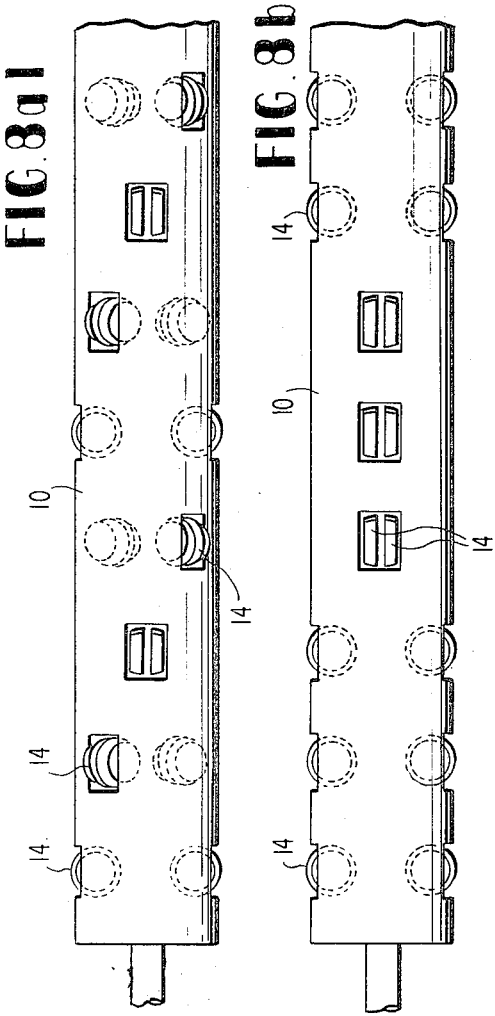
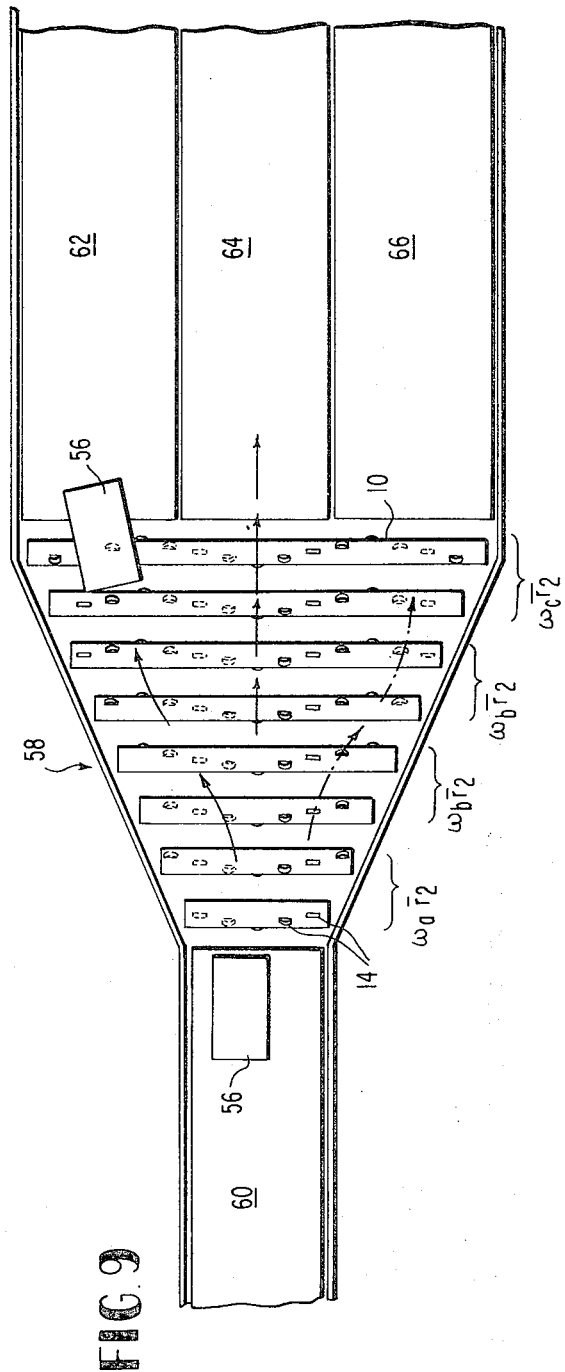

3,804,230

CONVEYOR TRANSFER STATION

BACKGROUND OF THE INVENTION

1. Field of the Invention

This invention relates generally to conveyors for transporting individual articles, such as boxes or pallets. In particular, it relates to a device for selectively transferring such articles from one or more incoming conveyors to a selected one of a plurality of outgoing conveyors.

2. Description of the Prior Art

The broad concept of a conveyor transfer station composed of a plurality of transfer rollers in each of which small rollers are mounted in a large roller with their axes at an angle to the axis of the large roller is well known in the art. It is illustrated, for instance, by U.S. Pat. Nos. 1,123,851 and 3,356,236. However, the devices shown therein, as well as other similar devices known to the applicant, are all subject to the objection that they do not provide a positive drive for the small rollers and are therefor limited in transfer capability. The present invention is designed to overcome this limitation in the prior art.

SUMMARY OF THE INVENTION

Conveyor transfer stations made according to the present invention comprise a plurality of roller assemblies, each of which in turn comprises a hollow cylindrical roller having a plurality of spaced apertures in the surface thereof, a plurality of stub rollers mounted in the hollow roller such that their axes of rotation are not parallel to the axes of rotation of the hollow roller and a portion of their surfaces protrude through corresponding apertures in the hollow roller, and means for rotating the hollow roller and the stub rollers independently.

BRIEF DESCRIPTION OF THE DRAWINGS

FIG. 4 is a plan view in partial section of a transfer roller assembly according to the present invention.

FIG. 5 is a side view in partial section of the transfer roller shown in FIG. 4.

FIG. 6 is a view taken along the lines 6—6 in FIG. 5.

FIG. 7 is a view taken along the lines 7—7 in FIG. 5.

FIG. 8a1 and 8b1 are simplified plan views of two alternative embodiments of transfer roller assemblies according to the present invention, and FIGS. 8a2 and 8b2 are simplified cross-sectional views of the embodiments shown in the corresponding plan views.

FIG. 9 is a simplified plan view of an alternative embodiment of a conveyor transfer station according to the present invention.

DETAILED DESCRIPTION OF A PREFERRED EMBODIMENT

Before describing the preferred embodiment in detail, it may be helpful to describe the theory of the present invention with the aid of greatly simplified plan and end views of the preferred embodiment and a series of schematic velocity diagrams.

Figure 1A:
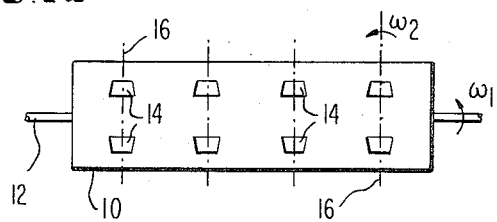
FIG. 1a and 1b are, respectively, a greatly simplified plan and end views of a transfer roller assembly according to the present invention.
Figure 1B:
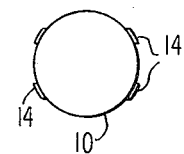

FIGS. 1a and 1b shows a relatively large roller 10, which is rotatable in either direction around its longitudinal axis 12. Mounted interiorly of the large roller 10 are a plurality of stub rollers 14, which are rotatable *independently* of the rotation of the large roller 10 in either direction around their axes 16 (shown only in FIG. 1a for reasons which will become apparent as the description progresses). A portion of the surfaces of the rollers 14 protrudes slightly through appropriate apertures in the surface of the large roller 10. Thus, an article passing over the plane defined by a plurality of such transfer roller assemblies lying in a planar array comes into contact both with the surfaces of the large rollers 10 and the surfaces of the stub rollers 14.

If the large rollers 10 in the array are driven at an angular velocity $\omega_1$ in either direction and the stub rollers 14 are not driven, the articles passing over the transfer station will be subjected to frictional engagement with the surfaces of the large rollers 10 moving at a tangential linear velocity of $\omega_1 r_1$, where $r_1$ is the radius of the large rollers 10. If, on the other hand, the stub rollers 14 are driven at an angular velocity $\omega_2$ in either direction and the large rollers 10 are not driven, the articles passing over the transfer station will be subjected to frictional engagement with the moving surfaces of the stub rollers 14. In the preferred embodiment, the tangential linear speed will vary across the surface of these rollers because, as best seen in FIG. 7, the radius $r_2$ of the stub rollers 14 varies. However, the variation need not be large, and the torque which would otherwise be imparted to articles subject to such unequal frictional engagement can be largely eliminated by forming the stub rollers 14 with symmetrical surfaces, thereby cancelling out the deviant force vectors. Accordingly, for present purposes the tangential linear velocity of the stub rollers 14 can be taken as $\omega_2 \bar{r}_2$, where $\bar{r}_2$ is the average radius of the portions of the stub rollers 14 protruding through the apertures in the large rollers 10.

The tangential linear velocities of the large rollers 10 and the stub rollers 14 may not be transmitted as such to an article passing over the conveyor transfer station because of slippage caused by the unevenness of the overall surface of the transfer roller assemblies and because of the high ratio of the area of the surfaces of the large rollers 10 making contact with the article to the areas of the surfaces of the stub rollers 14 making contact with the article. However, it has been found in practice that the tangential linear velocities of the respective classes of rollers make fairly good approximations for the linear velocities which will be imparted to articles passing over the transfer station. In any event, it is clear that a consistent linear velocity will be imparted to a given class of articles for a given tangential linear speed of each class of rollers, and this fact may be used in designing appropriate input and output conveyors.

Figure 2A:
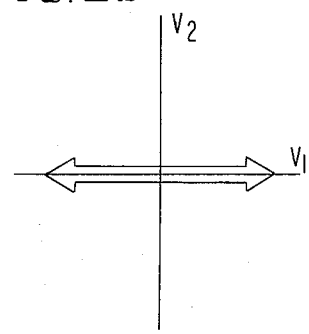
FIGS. 2a through 2c are schematic diagrams which will be used in explaining the operation of the present invention.
Figure 2B:
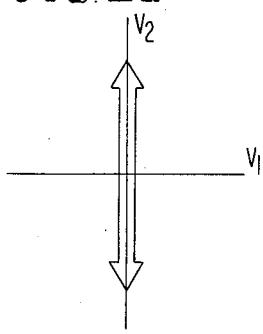
Figure 2C:
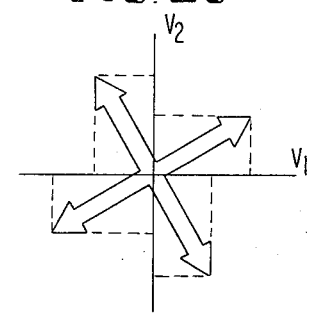

FIGS. 2a through 2c are schematic velocity diagrams, showing the velocities imparted to an article passing over the transfer station by various combinations of movements of the two classes of rollers. FIG. 2a illustrates the abscissal velocities which can be imparted to such an article by rotation of the large rollers 10 only, and FIG. 2b illustrates the ordinatal velocities which can be imparted to such an article by rotation of the stub rollers 14 only. FIG. 2c illustrates a variety of arbitrary velocity vectors which can be obtained by the selection of appropriate angular velocities $\omega_1$ and $\omega_2$. It should, however, be pointed out that, if the dimensions of the article in the plane making contact with the transfer station are small with respect to the distance separating the axes of the large rollers 10, the actual velocity vector may not be constant but many fluctuate as the article comes into and goes out of contact with the surface of the stub rollers 14.

Figure 3:
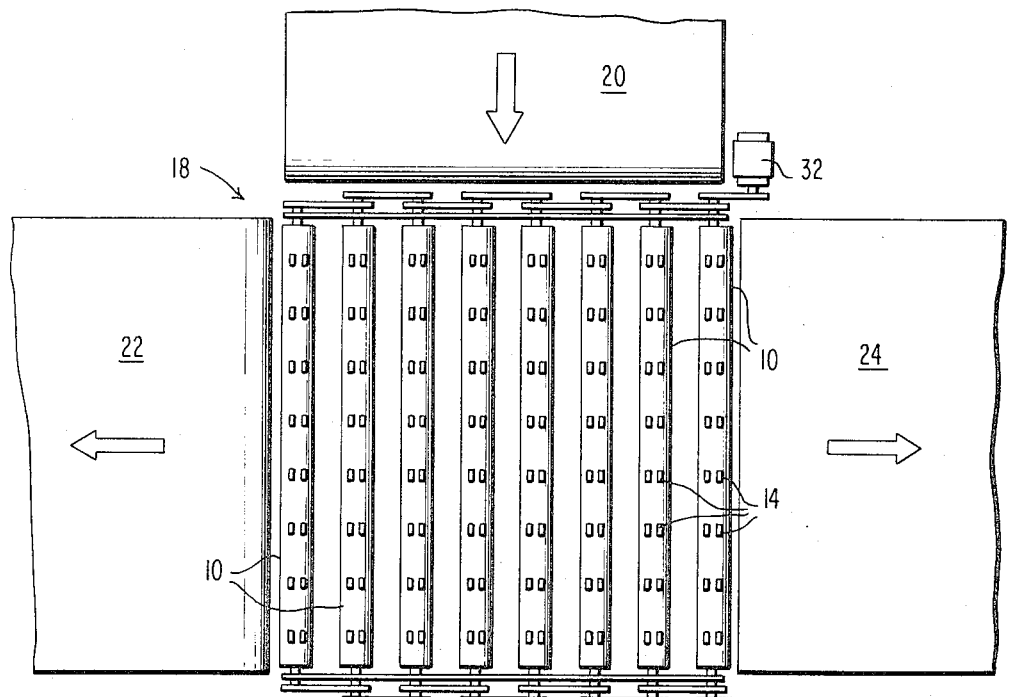
FIG. 3 is a simplified plan view of a conveyor transfer station according to the present invention.

FIG. 3 shows a three-way conveyor transfer station 18 employing the present invention. As shown therein, articles may be brought to the transfer station 18 by an incoming conveyor 20, which may of any appropriate type. Once deposited on the transfer station 18, the articles may be selectively transferred to any one of the three outgoing conveyors 22, 24, and 26, depending on the way in which the large rollers 10 and the stub rollers 14 are driven by the motors 28 and 32, respectively. In fact, if the directions of the incoming and outgoing conveyors are reversible, the transfer station can be four ways, for it, per se, is capable of transferring an article from any one of the four conveyors to any other one of them.

The make-up of a preferred embodiment of a transfer roller assembly according to the present invention will now be set forth in detail in connection with FIGS. 4, 5, 6, and 7.

As will be seen from the above-mentioned figures, the roller 10, which previously has been referred to simply as a relatively large roller 10, is in fact a hollow, cylindrical roller 10. This roller is driven, from the left end thereof only, via sprockets 34 and 36; as shown in FIG. 3, one of the sprockets 34 and 36 is connected to a source of rotational power and the other may be connected to the next transfer roller assembly in the series, thereby transmitting rotational power to it.

As may best be seen in FIGS. 4 and 7, mounted within the hollow cylindrical roller 10 are a plurality of spool-shaped stub rollers 14. In the preferred embodiment, the axis of rotation of each of the stub rollers 14 is perpendicular to a line radial to the axis of rotation of the hollow cylindrical roller 10 and lies in a plane perpendicular to the axis of rotation of the hollow cylindrical roller 10. However, neither of these limitations is essential, the only essential limitation being that the axis of rotation of the stub roller 14 not be parallel in the axis of rotation of the hollow cylindrical roller 10. In particular, if the axis of rotation of each of the stub rollers 14 is perpendicular to a line radial to the axis of rotation of the hollow cylindrical roller 10, but the axis of the stub rollers 14 do not lie in a plane perpendicular to the axis of rotation of the hollow cylindrical roller 10, the stub rollers 14 will tend to drive articles passing over the transfer station at an angle to the axis of the hollow cylindrical roller 10 other than 90°. This construction may be employed as an alternative for achieving the same result by means of any appropriate selection of velocity components, as discussed previously. If the axis of rotation of the stub rollers 14 is not perpendicular to a line radial to the axis of rotation of the hollow cylindrical roller 10, the surface of the stub rollers 14 will be skewed with respect to the surface of the hollow cylindrical roller 10, and the more the relationship departs from the perpendicular, the more deviant torque would be applied to articles passing over the transfer station. However, it seems clear that a certain amount of such deviancy could be tolerated, and I accordingly do not wish it to be thought that my invention is limited to devices in which the axis of rotation of each of the stub rollers 14 is exactly perpendicular to a line radial to the axis of rotation of the hollow cylindrical roller 10.

As previously mentioned, the stub rollers 14 are spool-shaped, having a central portion 38 and two head portions, 40 and 42. Each of the stub rollers 14 is associated with two spaced apertures 44 and 46 in the surface of the hollow cylindrical rollers 10 in a manner permitting a portion of one of the two head portions 40 and 42 of each of the spool-shaped stub rollers 14 to protrude through each of the spaced apertures 44 and 46. The protruding portions of the stub rollers 14 are, obviously, the parts which come into contact with articles passing over the transfer station and therefore contain the working surfaces of the stub roller 14.

Located on the central portion 38 of the stub rollers 14 is a driven worm gear 48, which is conveniently formed as a part of the stub roller 14 by extrusion molding the whole unit. Each stub roller 14 is positioned so that its driven worm gear 48 meshes with a driving worm gear 50 which is mounted in the hollow cylindrical roller 10 so that the axis of rotation of the former coincides with the axis of rotation of the latter. The driving worm gear 50 is driven, from the right end thereof only, via sprockets 52 and 54. As shown in FIG. 3, one of the sprockets 52 and 54 is connected to a source of rotational power and the other may be connected to the next transfer roller assembly in the series, thereby transmitting rotational power to it.

It should now be apparent why a gear reducer 30 is shown in FIG. 3 between the motor 28 and the first sprocket 34 but no gear reducer is shown between the motor 32 and the first sprocket 54. Assuming that the motors 28 and 32 are identical in construction, to make the tangential linear velocities of the hollow cylindrical rollers 10 and the stub rollers 14 approximately equal, it is necessary to substantially reduce the angular velocity of the output of the motor 28 before it is applied to the transfer roller assembly.

The above-described preferred embodiment of the present invention has the stub rollers 14 mounted along straight lines parallel to the axis of the hollow cylindrical roller 10 and running substantially the entire length of the latter. This embodiment is presently preferred on the basis of its relatively low cost and ease of manufature, but two alternative embodiments are shown in simplified schematic form in FIGS. 8a1 through 8b2. In particular, FIGS. 8a1 and 8a2 show an embodiment in which the portions of the surfaces of the stub rollers 14 protruding through the apertures in the surface of the hollow cylindrical roller 10 lie along helical lines in the surface of the latter, and FIGS. 8b1 and 8b2 show an embodiment in which the portions of the surfaces of the stub rollers 14 protruding through the apertures in the surface of the hollow cylindrical roller 10 lie along a series of straight lines parallel to the axis of the latter. It is believed that all of the illustrated embodiments, as well as many more which could be readily devised, can be operated to provide the same type of lateral transfer or diversion.

Just as the specifics of the transfer roller assemblies can be varied without departing from the scope of the present invention, the specifies of the conveyor transfer station can be varied. FIG. 3 shows a simple three-way conveyor transfer station, and FIG. 9 shows a substantially more sophisticated three-way conveyor transfer station. In this embodiment, articles 56 are brought to the transfer station 58 by an incoming conveyor 60 and are transferred selectively to outgoing conveyors 62, 64, or 66. To transfer the articles 56 to the outgoing conveyor 62, the hollow cylindrical rollers 10 are driven to the right and the stub rollers 14 are driven toward the top of the drawing; to transfer the articles 56 to the outgoing conveyor 64, only the hollow cylindrical roller 10 is driven; and to transfer the articles 56 to the outgoing conveyor 66, the hollow cylindrical rollers are driven to the right and the stub rollers 14 are driven toward the bottom of the drawing. While the angular velocities of all the stub rollers 14 could be made equal, it may be found preferable to vary their speeds, in effect giving a small turning impetus to the articles 56 at the start and the end of the maneuver and a relatively large turning impetus in the middle. To accomplish this, the tangential linear velocities of the stub rollers 14 can easily be varied in the fashion $\omega_a \bar{r}_2 < \omega_b \bar{r}_2 > \omega_c \bar{r}_2$ by selection of appropriate sprocket sizes or other power transmission means, where $\omega_a$, $\omega_b$, and $\omega_c$ are the angular velocities of the indicated stub rollers 14 and $\bar{r}_2$ is, as before, the average radius of the working surfaces of the stub rollers 14.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. A conveyor transfer station comprising a plurality of transfer roller assemblies mounted in a planar array, each of said transfer roller assemblies comprising:
   a. a hollow cylindrical roller having a plurality of spaced apertures in the surface thereof;
   b. a plurality of stub rollers mounted in said hollow cylindrical roller such that their axes of rotation are not parallel to the axis of rotation of said hollow cylindrical roller and a portion of the surface of each of said stub rollers protrudes through a corresponding one of said plurality of spaced apertures in said hollow cylindrical roller;
   c. means for rotating said hollow cylindrical roller about its axis; and
   d. means for rotating said stub rollers about their axis, said means for rotating said stub rollers about their axis being independent of said means for rotating said hollow cylindrical roller about its axis.

2. A conveyor transfer station as claimed in claim 1 wherein the axis of rotation of each of said stub rollers is perpendicular to a line radial to the axis of rotation of said hollow cylindrical roller.

3. A conveyor transfer station as claimed in claim 2 wherein the axis of rotation of each of said stub rollers is in a plane perpendicular to the axis of rotation of said hollow cylindrical roller.

4. A conveyor transfer station as claimed in claim 1 wherein:
   a. said means for rotating said stub rollers about their axes comprise a driving worm gear mounted in said hollow cylindrical roller such that the axis of rotation of said worm gear coincides with the axis of rotation of said hollow cylindrical roller;
   b. said stub rollers are spool-shaped, having a central portion and two head portions, and the central portion of said spool-shaped stub rollers includes a driven worm gear; and
   c. said stub rollers are mounted in said hollow cylindrical rollers such that said driving worm gear engages each of said driven worm gears,
whereby the rotational motion of said driving worm gear can be transferred to said driven worm gears.

5. A conveyor transfer station as claimed in claim 4 wherein each of said stub rollers is associated with two of said spaced apertures in the surface of said hollow cylindrical roller, a portion of one of the two head portions of each of said spool-shaped stub rollers protruding through each of said two spaced apertures.

6. A conveyor transfer station as claimed in claim 1 wherein the portions of the surfaces of said stub rollers protruding through said apertures in the surface of said hollow cylindrical roller lie along straight lines parallel to the axis of said hollow cylindrical roller.

7. A conveyor transfer station as claimed in claim 1 wherein the portions of the surfaces of said stub rollers protruding through said apertures in the surface of said hollow cylindrical roller lie along helical lines in the surface of said hollow cylindrical roller.

8. A transfer roller assembly comprising:
   a. a hollow cylindrical roller having a plurality of spaced apertures in the surface thereof;
   b. a plurality of stub rollers mounted in said hollow cylindrical roller such that their axes of rotation are not parallel to the axis of rotation of said hollow cylindrical roller and a portion of the surface of each of said stub rollers protrudes through a corresponding one of said plurality of spaced apertures in said hollow cylindrical roller;
   c. means for rotating said hollow cylindrical roller about its axis; and
   d. means for rotating said stub rollers about their axis, said means for rotating said stub rollers about their axis being independent of said means for rotating said hollow cylindrical roller about its axis.

9. A transfer roller assembly as claimed in claim 8 wherein the axis of rotation of each of said stub rollers is perpendicular to a line radial to the axis of rotation of said hollow cylindrical roller.

10. A transfer roller assembly as claimed in claim 9 wherein the axis of rotation of each of said stub rollers is in a plane perpendicular to the axis of rotation of said hollow cylindrical roller.

11. A transfer roller assembly as claimed in claim 8 wherein:
   a. said means for rotating said stub rollers about their axes comprise a driving worm gear mounted in said hollow cylindrical roller such that the axis of rotation of said worm gear coincides with the axis of rotation of said hollow cylindrical roller;
   b. said stub rollers are spool-shaped, having a central portion and two head portions, and the central portion of said spool-shaped stub rollers includes a driven worm gear; and c. said stub rollers are mounted in said hollow cylindrical rollers such that said driving worm gear engages each of said driven worm gears, whereby the rotational motion of said driving worm gear can be transferred to said driven worm gears.

12. A transfer roller assembly as claimed in claim 11 wherein each of said stub rollers is associated with two of said spaced apertures in the surface of said hollow cylindrical roller, a portion of one of the two head portions of each of said spool-shaped stub rollers protruding through each of said two spaced apertures.

13. A transfer roller assembly as claimed in claim 8 wherein the portions of the surfaces of said stub rollers protruding through said apertures in the surface of said hollow cylindrical roller lie along straight lines parallel to the axis of said hollow cylindrical roller.

14. A transfer roller assembly as claimed in claim 8 wherein the portions of the surfaces of said stub rollers protruding through said apertures in the surface of said hollow cylindrical roller lie along helical lines in the surface of said hollow cylindrical roller.

* * * * *